Feb. 17, 1959 R. B. AITCHISON ET AL Re. 24,603

CHURN DRILL FOR THERMAL ROCK PIERCING

Original Filed Sept. 1, 1948

INVENTORS
ROBERT B. AITCHISON
GEORGE H. SMITH
BY
ATTORNEY

United States Patent Office

Re. 24,603
Reissued Feb. 17, 1959

24,603

THERMAL ROCK PIERCING

Robert B. Aitchison, New York, N. Y., and George H. Smith, Indianapolis, Ind., assignors, by mesne assignments, to Union Carbide Corporation, a corporation of New York Original No. 2,694,550, dated November 16, 1954, Serial No. 47,214, September 1, 1948. Application for reissue September 20, 1956, Serial No. 611,414

4 Claims. (Cl. 255—1.8)

Matter enclosed in heavy brackets [ ] appears in the original patent but forms no part of this reissue specification; matter printed in italics indicates the additions made by reissue.

This invention relates to thermal mineral piercing method and apparatus therefor [including a combined oxy-fuel blowpipe and churn drill bit].

The expense and slowness of mechanical rock drilling are such that it has been proposed to employ an oxy-fuel blowpipe for piercing holes in minerals of a heat spallable nature, such as quartzite, ganister, and the like. The blowpipe is positioned to direct oxy-fuel flames against the mineral, and the resultant heat spalls off particles of rock at the bottom of the hole. The particles are removed and the blowpipe is fed into the hole as the depth of the hole increases, to apply heat to the mineral particles therebelow.

Heretofore it has been found that when a stratum of material such as clay is encountered, this material fuses and forms a plug, and it has been proposed that such plug may be broken up by vigorously rotating the blowpipe. However, this proposal is prohibitive for holes of great depth, because of the expense of the mechanical power required, and the impossibility of manually rotating the weight of the corresponding length of blowpipe. The connections for separately supplying fuel and oxidizing gas, and for supporting and manipulating the blowpipe have required so much space as contrasted to the narrow confines of the hole that heretofore such provisions and connections have been located above the top of the hole. Hence the length of the blowpipe has been required to be greater than the footage of the hole to be pierced. When the length of the blowpipe exceeds twenty feet or more, the difficulty of manually twisting or rotating the great weight is correspondingly increased. There is also the problem of preventing the hoses which supply fluids to the blowpipe from being twisted into a knot. Furthermore, the problem of the height of tower required to handle such long blowpipe is a major difficulty.

We have found that when an open seam or fissure is reached in the sub-stratum, that a necking in may result at that point which sometimes prohibits passage of the blowpipe, but in any event slows up piercing progress until the necked in portion often referred to as a collar is removed. If a single axial flame is used, this condition is accentuated because the flame breaks through the floor of the hole at about the center due to the shape of the bottom of the hole being substantially similar to a cup or basin. When a flame break through occurs some of the value of the flame is dissipated through the hole and enlargement of the hole becomes difficult. This collar or necked in condition developed when a fissure is encountered is a much more series problem than the ball of fused clay hereinbefore referred to, and in fact when oxy-kerosene is employed clay does not form a plug.

Objects of the present invention are therefore to avoid the difficulties and solve the problems referred to above to remove such narrow section or collar without the necessity of rotating the blowpipe, to provide a strengthened blowpipe with a flame producing tip having protective hard metal teeth for removing such collar by gravity impact, to permit piercing of holes of great depth by blowpipes of short length, to provide connections for supplying fluids to the blowpipe and for manipulating the blowpipe all located within the confines of the hole and therefore insertable with the blowpipe into the hole, and to provide a streamlined combined oxy-fuel blowpipe and churn drill bit.

Other objects and features of novelty will be apparent from the following description and the accompanying drawing[s, in which:].

*In accordance with the present invention, a method is provided for thermally piercing an elongated vertical hole in a mineral body employing a thermal piercing blowpipe having a length less than the depth of the hole to be pierced and supplied with piercing fluids through flexible conduits whereby the length of the blowpipe does not limit the depth to which the hole can be pierced. The blowpipe is suspended above the mineral body and a high temperature flame and quenching fluid are applied from the lower end of the blowpipe against the mineral body to remove material therefrom and form a hole therein. Normal advancement of the flame from the blowpipe at a desired feed rate downwardly to form and deepen the hole is accomplished by continuous reciprocation of the blowpipe coupled with steady forward advancement of the blowpipe. If and when a plug of fused material is uncovered in the normal advancement of the blowpipe the normal advancement and reciprocation are arrested, the blowpipe is elevated and released thereby causing it to fall under the acceleration of gravity to deliver a mechanical impact against the plug to remove the plug. These elevating and releasing steps are continued until the plug is removed through the combined effect of mechanical impact and high temperature flame application. Thereupon normal advancement coupled with reciprocation may be continued to deepen the hole.*

*In the accompanying drawing:*

Figure 1:
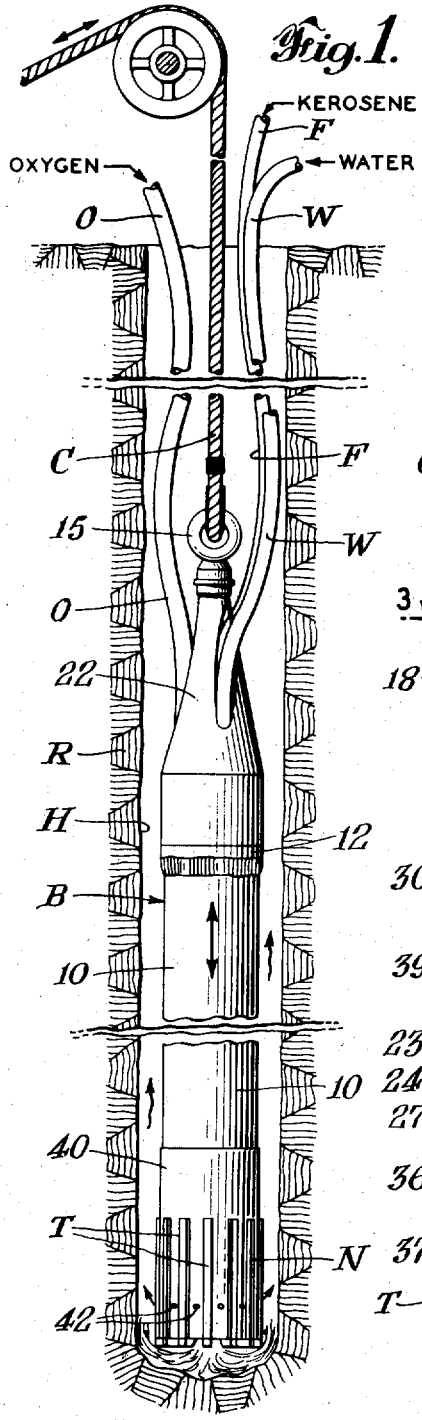
Fig. 1 is a section through a hole in mineral material, showing in elevation therein the combined oxy-fuel blowpipe [and churn drill bit according to the preferred embodiment of the present] *embodying the* invention, with the fluid connections and supporting structure streamlined and lowered into the hole below the top thereof.
Figure 2:
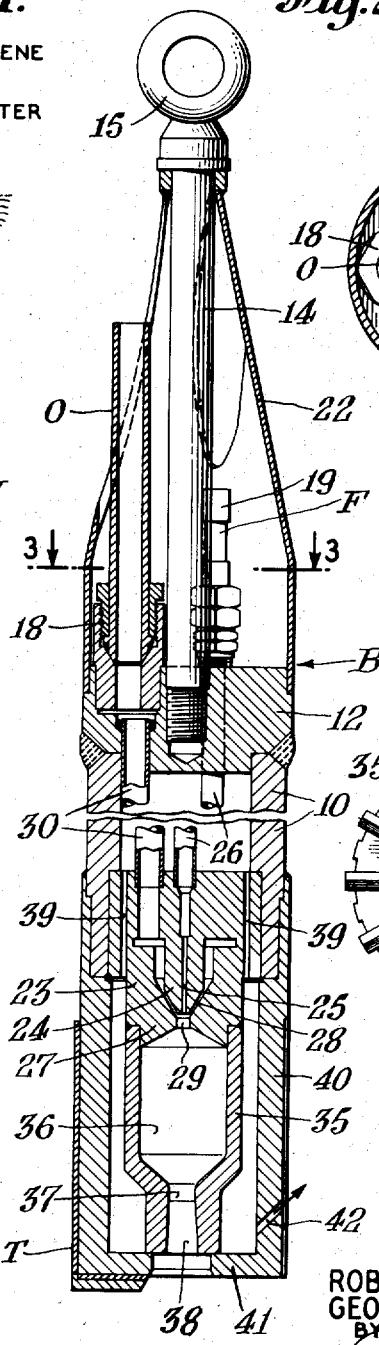
Fig. 2 is a vertical section through the blowpipe shown in Fig. 1.
Figure 3:
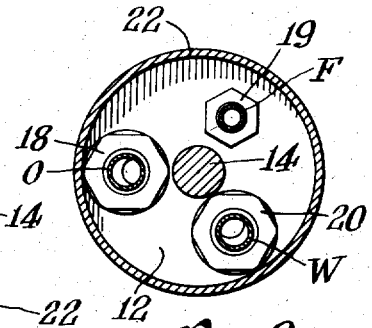
Fig. 3 is a transverse section taken along the line 3—3 of Fig. 2.
Figure 4:
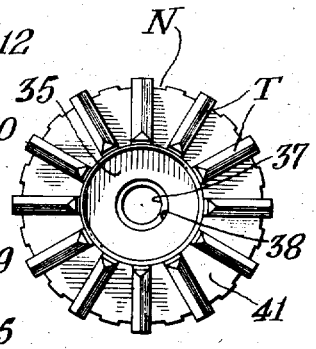
Fig. 4 is an inverted plan view of the bottom of the same blowpipe.

Referring to the drawings in general, the blowpipe B is shown in process of piercing a hole H in mineral material R. The blowpipe B is suspended by a cable C which extends down into the hole H and is connected to the streamlined top or rear end of the blowpipe B. The lower end of the blowpipe B has a nozzle N for projecting oxy-fuel flames against the material R at the bottom of the hole H. Oxidizing gas is supplied by a flexible hose O which extends down into the hole H and is connected to the top of the blowpipe B. Fluid fuel is supplied by another flexible hose F, and particle ejecting fluid is supplied by a third flexible hose W, both extending down into the hole H and connected to the rear end of the blowpipe. The nozzle N is surrounded by hard metal teeth T, which when the blowpipe is raised by the cable C and dropped, remove any narrow sections of the hole H by gravity impact.

Referring more particularly to the drawings, the blowpipe B comprises a metal body tube 10 having its upper end closed by a plug 12 welded thereto. A supporting rod 14 is screwed into the plug 12, and terminates in an eye 15 for attachment to the cable C. The plug 12 is bored to provide fluid passages respectively fitted with a nipple 18 for the oxygen hose O, a nipple 19 for the fuel hose F and another nipple 20 for the water hose W.

The supporting rod 14 and the three nipples are located inside the greatest diameter of the blowpipe, and are enclosed by a cone 22 connecting the top of the plug 12 and the eye 15, suitably cut away to receive the respective hoses for the nipples, and forming a streamlined tail for the blowpipe to prevent its being caught on irregularties in the hole during its movement in the hole.

A suitable burner is mounted at the bottom of the blowpipe, preferably of the oxy-fuel internal combustion type, and in the preferred embodiment shown by way of example, the lower end of the body 10 is provided with an injector 23 which has a conical insert 24 provided with a central bore 25 connected by a tube 26 with the nipple 19 for the fluid fuel, and forming a fuel ejection nozzle. The lower portion 27 of the injector 23 is fitted over the fuel nozzle 24 and has a conical inner wall spaced therefrom to form a conical oxygen passage 28 terminating in a restricted throat 29. The passage 28 is connected by a tube 30 with the nipple 18 for the oxidizing gas.

The injector 23 extends beyond the end of the tube 10, and joins a flame tip member 35 which forms therewith a substantially cylindrical combustion chamber 36. Beyond the chamber 36 the flame tip member 35 is sharply restricted to form a throat 37 and therebeyond slightly flared toward the exit to form a flame nozzle 38.

The fuel, such as relatively inexpensive kerosene, is injected at high pressure greater than 15 pounds per square inch gauge through the bore 25 into the combustion chamber 36 inside the flame tip 35. The oxidizing agent such as gaseous oxygen is concurrently but separately delivered at high pressure greater than 15 pounds per square inch gauge to the conical passage 28. The fuel and oxygen mix intimately together in passing through throat 29, and the mixture burns vigorously in chamber 36 at a combustion pressure greater than 15 pounds per square inch gauge, producing flaming combustion gases which rush through the discharge throat 37 and the flaring passage 38 to provide an axially directed flame jet. The nozzle is less subject to functional damage by flying detritus and by impact against the bottom of the hole than are external combustion chambers.

The cooling water from the nipple 20 fills the space inside the body tube 10 and outside of the tubes 26 and 30. From this space the cooling water passes through bores 39 in the injector 23 outside of the oxygen nozzle 27.

Secured to the bottom of the tube 10 outside of the injector 23 is a strengthening head formed by a sleeve 40, which extends beyond the bottom of the flame tip member 35. The lower end of the sleeve 40 has an internal flange 41 which engages the flared portion 38 of the flame tip member 35. The space between the flame tip member 35 and the sleeve 40 receives water from the bores 39. The sleeve 40 has upwardly inclined bores 42 through which water and/or resultant steam are discharged to eject spalled particles from the hole. The bores 42 are alternated between the hard metal teeth T on the outside of the sleeve 40, which are continued under the flange 41. The sleeve 40 thus forms a strengthening head and a cutter, as well as an outer wall for the cooling jacket and a nozzle for the particle ejecting fluid.

In the operation of the blowpipe in piercing a hole, the blowpipe B is reciprocated by the cable C, the reciprocation being continued all of the time that the blowpipe is being lowered. Thus the churn drill action of the teeth T as plungers or chisels combines with the blowpipe flame action to accelerate the piercing of the hole. Thus when a fissure is encountered, the necked in portion may even be removed as it is formed, any unusual resistance being overcome by increasing the stroke of the reciprocating action. When a necked in portion or plug of difficulty separable material is encountered which cannot be removed in this manner the blowpipe is then hoisted a distance above such plug and allowed to fall under the influence of gravity striking the plug and thus removing it by the combination of impact and heat. This procedure may have to be repeated if the plug is not removed on the first attempt. While there is no intentional rotation, any slight twisting due to the flexibility of the cable merely tends to cause the plunger or chisel teeth T to impact the obstruction at positions slightly angularly displaced from the points of previous impact. This operation is faster, and consumes less oxygen than the rotary type of long blowpipe heretofore employed.

We claim:

1. In a method for thermally piercing an elongated vertical hole in a mineral body by the application thereto of high temperature flame and a quenching fluid issued from a piercing blowpipe, wherein said blowpipe is suspended above a mineral body and flame and quenching fluid are applied from the lower end of said blowpipe against said body to remove material therefrom and form a hole therein, the improvement which comprises employing a piercing blowpipe having a length less than the depth of the hole to be pierced and supplied with the piercing fluids through flexible conduits whereby the length of said blowpipe does not limit the depth to which said hole can be pierced normally advancing the flame from said blowpipe at a desired feed rate downwardly to form and deepen said hole until a plug of fused material is encountered at the bottom of said hole, elevating and releasing said blowpipe thereby causing it to fall under the acceleration of gravity to deliver a mechanical impact against said plug, continuing said elevating and releasing steps until said plug is removed through the combined effect of mechanical impact and high temperature flame application, and thereafter continuing said normal advancement of said blowpipe to deepen said hole.

2. A method in accordance with claim 1, wherein said elevating and releasing steps are repeated whenever a plug of fused material is encountered during the normal operation of piercing said hole.

3. Apparatus for thermally piercing a mineral body for the production of an elongated vertical passage therein, comprising a blowpipe provided at its upper end with a hoisting cable connection whereby it is adapted to be suspended by a cable and lowered thereby into said passage as said passage increases in depth, a nozzle at the lower end of said blowpipe for projecting oxy-fuel flame, flexible hoses with hose connections provided at the upper end of said blowpipe for supplying oxidizing gas and fuel to said nozzle, and a series of hard metal teeth longitudinally positioned around the side of said nozzle, each of said teeth also extending radially about the base of said nozzle, said hoisting cable connection and said flexible hoses and hose connections lying within the geometrical cylinder determined by upward projection of said series of teeth, whereby said hoses and hose connections may all enter the hole formed by said blowpipe.

4. Apparatus for thermally piercing a mineral body for the production of an elongated passage therein, comprising a blowpipe provided at its upper end with a hoisting cable connection whereby it is adapted to be suspended by a cable and lowered thereby into said passage as said passage increases in depth, a nozzle at the lower end of said blowpipe for projecting oxy-fuel flame, a water jacket surrounding said nozzle, flexible hoses with hose connections provided at the upper end of said blowpipe for supplying oxidizing gas and fuel to said nozzle and water to said jacket, a series of hard metal teeth longitudinally positioned around the side of said nozzle, each of said teeth also extending radially about the base of said nozzle, said hoisting cable connection and said flexible hoses and hose connections lying within the geometrical cylinder determined by upward projection of said series of teeth, whereby said hoses and hose connections may all enter the hole formed by said blowpipe, and an annular series of discharge orifices from said water jacket interposed on the side of said nozzle between said teeth.

References Cited in the file of this patent or the original patent

UNITED STATES PATENTS

| | | |
|---|---|---|
| Re. 22,964 | Burch | Jan. 20, 1948 |
| 318,034 | Safford | May 19, 1885 |
| 1,833,477 | Tomanek | Nov. 24, 1931 |
| 1,842,454 | Lind | Jan. 26, 1932 |
| 2,327,482 | Aitchison et al. | Aug. 24, 1943 |
| 2,327,498 | Burch | Aug. 24, 1943 |
| 2,327,499 | Burch | Aug. 24, 1943 |
| 2,327,508 | Craig | Aug. 24, 1943 |
| 2,426,688 | Higgs | Sept. 2, 1947 |
| 2,436,002 | Williams | Feb. 17, 1948 |